US010116229B1

(12) United States Patent
Alshammaa et al.

(10) Patent No.: US 10,116,229 B1
(45) Date of Patent: Oct. 30, 2018

(54) MULTILEVEL CASCADE HEXAGONAL VOLTAGE SOURCE CONVERTER WITH ISOLATED DC SOURCES

(71) Applicant: KING SAUD UNIVERSITY, Riyadh (SA)

(72) Inventors: Abdulrahman Abdullah Ali Alshammaa, Riyadh (SA); Abdullah Mohammed Ali Noman, Riyadh (SA); Khaled Ebraheem Addoweesh, Riyadh (SA); Ayman Abdullah Abdulaziz Alabduljabbar, Riyadh (SA); Abdulrahman Ibrahim Alolah, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/709,282

(22) Filed: Sep. 19, 2017

(51) Int. Cl.
*H02M 5/458* (2006.01)
(52) U.S. Cl.
CPC ................................ *H02M 5/4585* (2013.01)
(58) Field of Classification Search
CPC .................................................. H02M 5/4585
See application file for complete search history.

(56) References Cited

U.S. PATENT DOCUMENTS

| 7,969,755 | B2* | 6/2011 | Davies | H02J 3/1864 363/35 |
| 8,351,233 | B2* | 1/2013 | Bernhard | H02J 3/36 363/125 |

| 2009/0237962 | A1 | 9/2009 | Yun |
| 2013/0063070 | A1 | 3/2013 | Zhang |
| 2014/0133198 | A1 | 5/2014 | Koyama |
| 2015/0022135 | A1 | 1/2015 | Yun |
| 2015/0029764 | A1 | 1/2015 | Peng |

FOREIGN PATENT DOCUMENTS

| CN | 103051236 A | 4/2013 |
| CN | 103078532 A | 5/2013 |
| CN | 105915088 A | 8/2016 |
| KR | 101197793 B1 | 11/2012 |

OTHER PUBLICATIONS

Laka et al., "New Hexagonal Three-Phase Voltage-Source Converter Topology for High-Power Applications", IEEE Transactions on Industrial Electronics, (2015) pp. 30-39, vol. 62, No. 1.

* cited by examiner

*Primary Examiner* — Emily P Pham
(74) *Attorney, Agent, or Firm* — Richard C. Litman

(57) ABSTRACT

The multilevel cascade hexagonal voltage source converter with isolated DC sources has a plurality of polyphase stages, each stage having AC inputs corresponding to a number of phases, and a numerically identical plurality of n outputs, cascaded by connection of the outputs of one stage to the inputs of a next stage. Each stage has plural DC-to-AC converters corresponding to the number of phases, and connected to one of the AC inputs, each having a connection for receiving DC power, and amplifying its AC outputs with the received DC power. The DC-to-AC converters are connected by split inductors, with each split inductor providing an output at a center tap terminal. The inductor half-segments are cross-connected with inductive cross-coupling links inductively connected to the inductor half-segments at opposite sides of the polyphase ring connection. The middle terminals of the n split inductors provide n AC outputs for its respective polyphase stage.

10 Claims, 14 Drawing Sheets

MULTILEVEL CASCADE HEXAGONAL VOLTAGE SOURCE CONVERTER WITH ISOLATED DC SOURCES

BACKGROUND

1. Field

The disclosure of the present patent application relates to electrical power conversion, and more particularly, to a multilevel cascade hexagonal voltage source converter with isolated DC sources that is a polyphaser multilevel electrical power converter.

2. Description of the Related Art

The power capability of any voltage source converters (VSCs) is restricted by the current and voltage rating that the power electronics devices can withstand. Although the power capability of existing semiconductor devices has been enhanced and new devices have materialized in the market, the power capability of conventional VSC topologies is not sufficient for high power applications. Thus, multilevel VSC topologies have been considered for high power applications. Among the available multilevel converter topologies, three types are considered conventional ones: (1) Neutral-Point Clamped (NPC); (2) Flying Capacitor (FC); and (3) Cascaded H-Bridge (CHB).

When a high number of voltage levels is necessary, a large number of clamping devices, such as diodes for NPC converters or capacitors for FC converters, are required. The separate direct current (DC) links in the CHB allow independent voltage control. The CHB has a modular structure and the least number of components used among all multi-level converters (NPC or FC) to reach the same number of voltage levels, leading to uncomplicated assembly and maintenance.

However, this topology suffers from three associated difficulties: (1) high components count; (2) the energy storage requirement is high because the instantaneous power involved with each H-bridge varies at twice the fundamental frequency due its single phase modular structure; and (3) it is difficult to control the voltage across DC link capacitors.

The concept of interconnecting three conventional three-phase VSCs to produce a multilevel waveform has been applied in medium voltage variable speed drives. In one example, three VSCs are interconnected in a delta configuration to produce a higher output voltage. Two of the phases of each VSC are connected to the other two VSCs through two current limiter inductors. The third phases of each VSC together form the three output phases of the overall topology.

In another configuration, three three-phase two-level VSCs are interconnected by using three single-phase transformers of 1:1 turn ratio. The interconnected transformers increase the output voltage and also suppress the circulating current inside the converter. The power capability of the overall converter is three times more than the capability of each interconnected converter. The result is a volt-ampere rating of each intermediate transformer equal to the volt-ampere rating of the each interconnected converter.

In another configuration, a topology called hexagonal converter is implemented, which combines three three-level NPC converters by using six inductors. For three-phase applications, the six terminals of this converter must be connected using an open end winding transformer. FIGS. 1A, 1B and 2 are schematic diagrams illustrating multilevel topologies based on cascaded two-level VSCs. The power capability of these topologies cannot be extended any more so that the generated voltage level is not as high as CHB topology. Thus, a multilevel cascade hexagonal voltage source converter with isolated DC sources solving the aforementioned problems is desired.

SUMMARY

The multilevel cascade hexagonal voltage source converter with isolated DC sources has a plurality of polyphase stages, in which each stage has a plurality of n alternating current (AC) inputs corresponding to a number of phases, with n=(number of phases), and a numerically identical plurality of n outputs. Each stage has a plurality of n DC-to-AC converters corresponding to the number of phases, each DC-to-AC converter being connected to one of the AC inputs corresponding to a phase so that the n DC-to-AC converters provide n DC-to-AC electrical conversions at that phase of their respective AC inputs, and each DC-to-AC converter providing two AC outputs. Each DC-to-AC converter is provided with a connection for receiving DC power, and amplifies its AC outputs with the received DC power.

The AC outputs of the DC-to-AC converters are connected to adjacent converters with split inductors. Each split inductor has two end terminals and a center tap terminal, with the inductor on respective sides of the center tap terminals forming inductor half segments, and the AC outputs of the DC-to-AC converters connected to adjacent ones of the split inductors at respective ones of the end terminals. The split inductors and the DC-to-AC converters establish a polyphase ring connection.

The plurality of n split inductors have inductive cross-coupling links, the inductive cross-coupling links inductively connected to the inductor half segments at opposite sides of the polyphase ring connection. The middle terminals of the split inductors provide n AC outputs for its respective polyphase stage. In the case of the polyphase stages being configured as three-phase stages, the ring connection provides a delta output at the center tap.

The plurality of polyphase stages are cascaded by connection of the outputs of one stage to the inputs of the next stage, thereby cascading AC current received at the inputs connected to the DC-to-AC converters.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
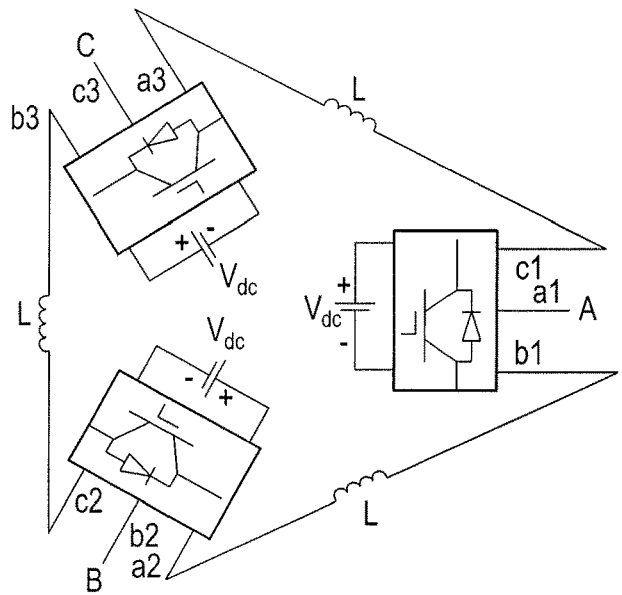
FIG. 1A is a two-level cascade voltage source converter topology according to the prior art with adjacent converters connected in series by simple inductors.
Figure 1B:
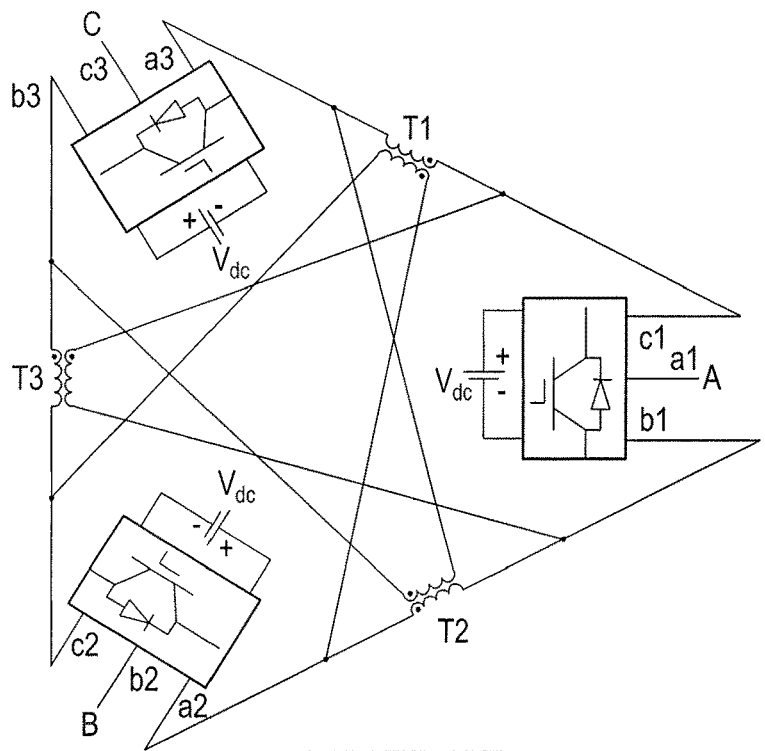
FIG. 1B is a two-level cascade voltage source converter topology according to the prior art with adjacent converters connected in series by transformers.
Figure 2:
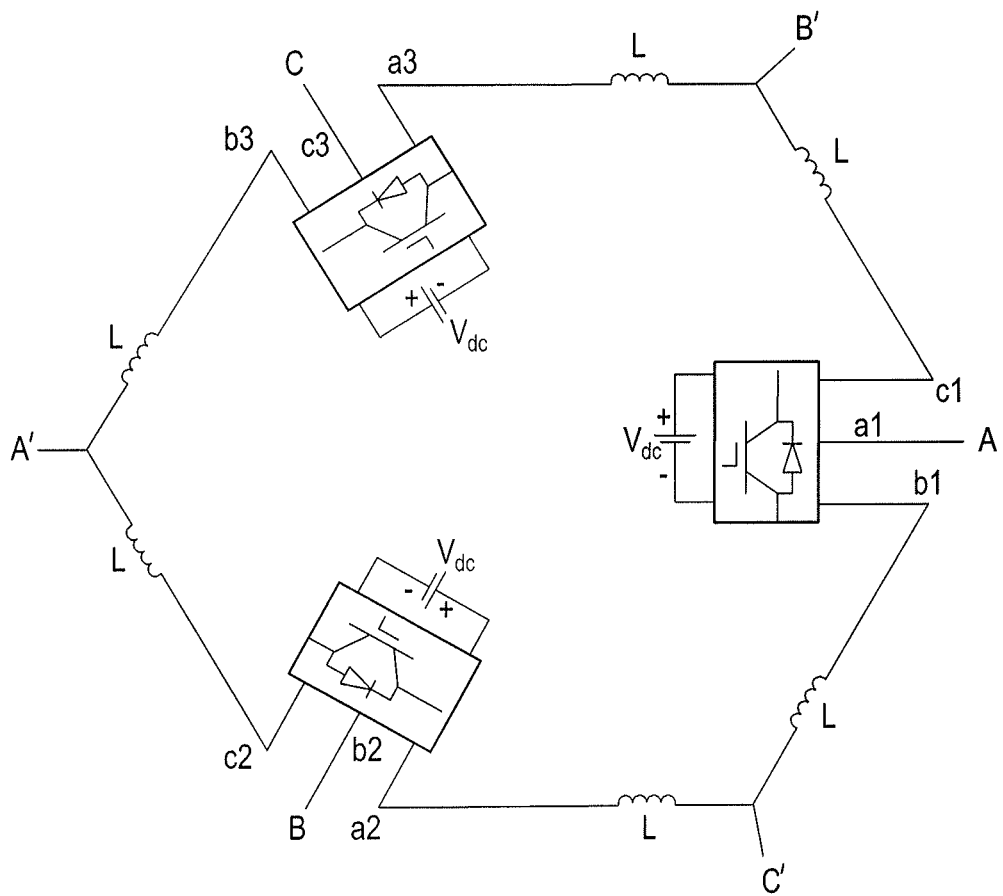
FIG. 2 is a two-level cascade voltage source converter topology according to the prior art with the converters connected in a hexagonal cell by split inductors.

The multilevel cascade hexagonal voltage source converter with isolated DC sources includes a combination of two or more three-phase hexagonal cells connected in cascade. Each hexagonal cell includes three three-phase converters with isolated dc links. The hexagonal cell can be formed using conventional two-level or multilevel converters, such as Neutral-Point Clamped (NPC) or Flying Capacitor (FC) converters Three coupled inductors are employed in the interconnections of each hexagonal cell to suppress circulating currents. The new topology is referred to herein as the Cascade Hexagonal Voltage Source Converter (CHEX-VSC).

To eliminate the above drawbacks of the multilevel converters synthesized from CHB, it is desired to utilize well-known power electronic building blocks (PEBBs), such as three-phase, two-level VSC, NPC, or FC converters to obtain multilevel voltage source converter (VSC) topologies. The PEBBs form stages. The current is processed as polyphase current, so the PEBBs are polyphase stages.

The PEBBs can be combined in series or parallel using current limiter inductors. In each of the series and parallel configurations, the power capability depends on the number of PEBBs that are utilized. The multilevel VSC-based conventional three-phase topologies reduces the excessively large number of DC capacitors needed by CHB converters, clamping diodes needed by multilevel diode-clamped converters, and flying capacitors needed by multilevel flying capacitor converters. The multilevel VSC-based conventional three-phase topology also has the following features. Multilevel VSC-based conventional three-phase topologies are more appropriate for high voltage/power applications than conventional ones. Multilevel VSC-based conventional three-phase topologies generate multilevel voltage waveforms. Since the present multilevel VSC-based conventional three-phase topologies consist of cascade connections of a plurality of three-phase converters supplied with an isolated DC link, neither voltage balancing nor voltage matching of switching devices is required. Finally, system packaging and layout is streamlined due to the simplicity and symmetry of structure, as well as minimization of component count.

Thus, the multilevel cascade hexagonal voltage source converter with isolated DC sources provides a new and improved multilevel VSC, and more specifically, a multilevel VSC-based conventional three-phase topology suitable for high-voltage, high-power applications.

A multilevel voltage source converter is configured in a multiple stage topography, referred to as a Cascade Hexagonal Voltage Source Converter (CHEX-VSC). The multilevel voltage source converter has a configuration analogous to a conventional three-phase converter, and uses multiple three-phase hexagonal cells connected in cascade, with isolated DC links. The stages comprise three coupled inductors or inductor circuits, which are employed in the interconnections of each hexagonal cell to suppress circulating currents. The configuration permits cascading of any number of hexagonal cells, each with any number of levels. The CHEX-VSC can be configured as any three phase converter for any application requiring polyphase voltage source converters.

The disclosed technology relates to a topology for cascading a plurality of multi-level hexagonal cells in order to provide more voltage/power output, enhanced power quality, and an increased number of output levels. The topology permits any number of hexagonal cells, each with any number of levels, to be cascaded. This allows connection to achieve high penetration, renewable energy resources to electric grid. The new topology is referred to herein as the Cascade Hexagonal Voltage Source Converter (CHEX-VSC).

Figure 3:
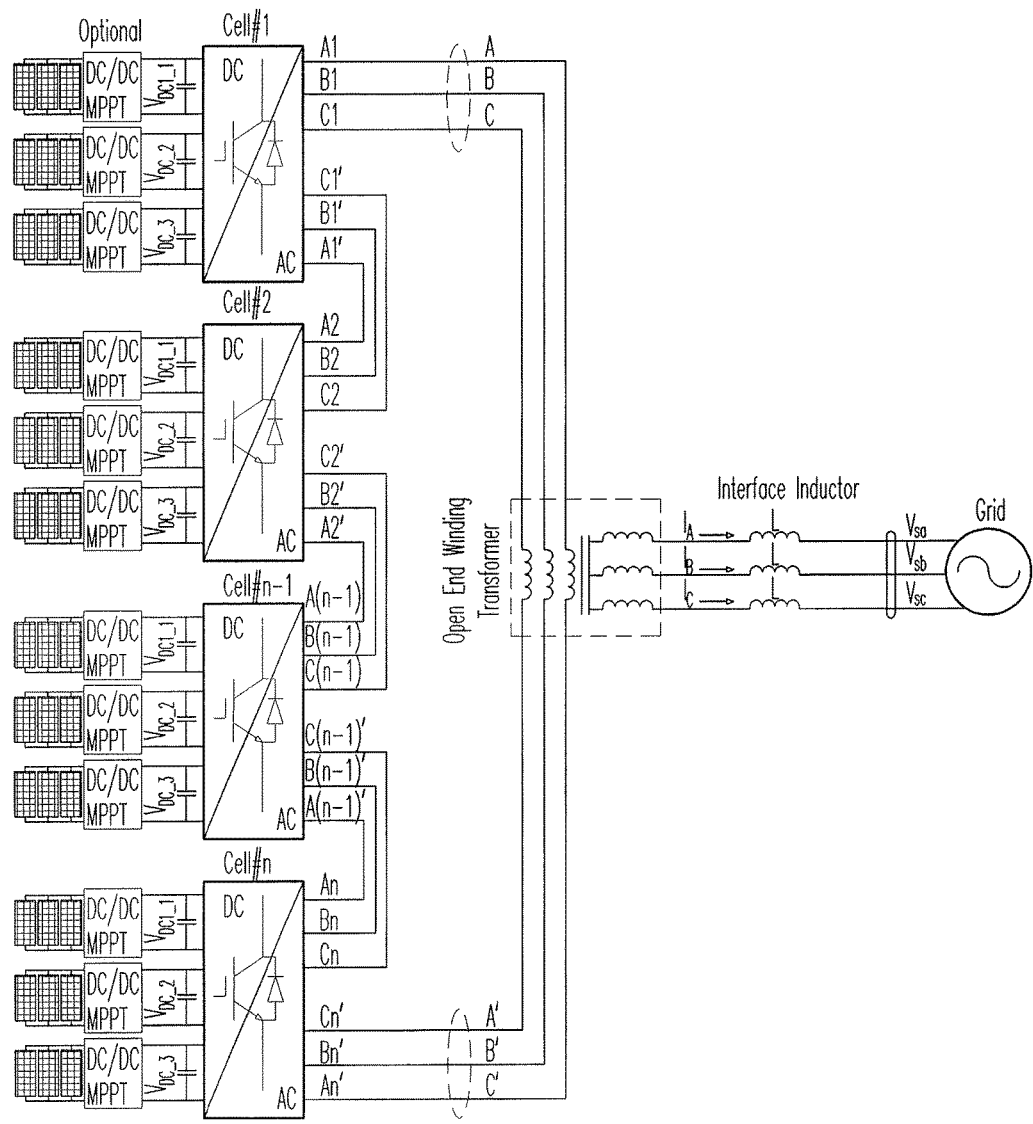
FIG. 3 is an electrical schematic of a generalized Cascade Hexagonal Voltage Source Converter (CHEX-VSC) according to one configuration.

FIG. 3 is an electrical schematic of a generalized CHEX-VSC. Shown is a block diagram of an inverter in accordance with the disclosed technology. More specifically, FIG. 3 shows an implementation of a symmetrical Cascade Hexagonal Voltage Source Converter (CHEX-VSC) for three-phase applications. The CHEX-VSC has six phases A, A', B, B' and C, C', that connect to an electric grid via an open-end winding transformer. As shown in FIG. 3, the CHEX-VSC includes 3N three-phase VSC modules, where N represents the number of hexagonal cells connected in series. Each VSC modules supplies $\frac{1}{3}$N of the CHEX-VSC output power. Each hexagonal cell includes three isolated DC voltage inputs, such as DC voltage inputs 1-1, 1-2 and 1-3 for the first cell, DC voltage inputs 2-1, 2-2 and 2-3 for the second cell, and DC voltage inputs N-1, N-2 and N-3 for the Nth cell. Each cell has six AC voltage outputs, such as a first AC voltage output A1, A1', B1, B1', C1 and C1' for the first cell, a second AC voltage output A2, A2', B2, B2', C2 and C2' for the second cell, and an Nth AC voltage output An, An', Bn, Bn', Cn and Cn' for the Nth cell.

While a three-phase application, showing six AC voltage outputs is shown, this configuration is only exemplary, as a different number of phases and a corresponding number of outputs is possible.

In this configuration, AC terminal nodes A1, B1 and C1 of a first cell have designated nodes (A, B, C) of the CHEX converter as output terminals. The other AC terminal nodes (A', B', C') of the CHEX converter are respectively formed using the AC terminal nodes AN', BN' and CN' of the Nth cell. The output terminal nodes Ax', Bx' and Cx' (i.e., x=1, 2, ... N) of the xth cell are respectively connected to A(x+1), B(x+1) and C(x+1) of the adjacent cell, and the other three AC terminal nodes of the xth cell are respectively connected to an adjacent cell terminal node. In accordance with the structure of cascaded multi-level hexagonal cells, the voltage outputs aggregate to provide an increased voltage/power output and a greater number of output levels.

Figure 4:
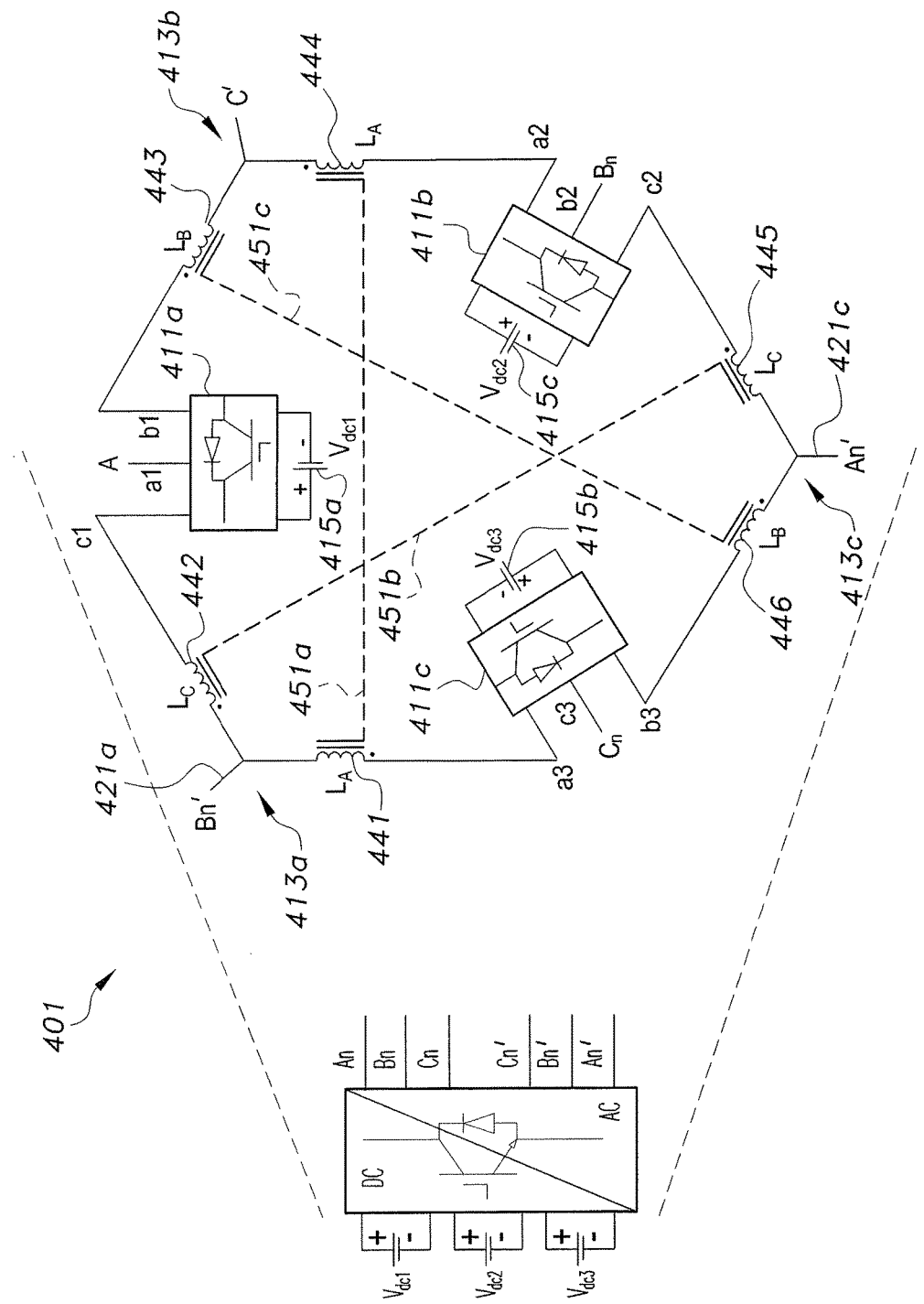
FIG. 4 is a circuit diagram illustrating a single power electronics building block used to construct a multilevel cascade hexagonal voltage source converter with isolated DC sources as described herein.

FIG. 4 is a circuit diagram illustrating a single power conversion stage 401 or cell, which is the power electronics building block of the disclosed technology. FIG. 5 is schematic view depicting exemplary configuration of two power conversion stages 401, 501 or cells in cascade, as a CHEX implemented in a three-phase configuration. In this example, each stage 401, 501 is configured as a three-phase VSC stage.

Depicted, for each stage 401, 501, are 3 DC-to-AC converters 411a, 411b, 411c, and 3 split inductors 413a, 413b, 413c connecting the DC-to-AC converters 411a, 411b, 411c. The split inductors 413a, 413b, 413c are configured with center taps 421a, 421b, 421c, which provide power outputs An', Bn', Cn'.

Also shown are DC source power units 415a, 415b, 415c, connected to respective ones of DC-to-AC converters 411a, 411b, 411c. DC source power units 415a, 415b, 415c may be batteries, photovoltaic cells, or other DC sources.

As shown in FIG. 4, each stage 401, 501 is configured so that the set of three split inductors 413a, 413b, 413c is separated by DC-to-AC converters 411a, 411b, 411c configured as DC-to-AC converters 411a, 411b, 411c. The split inductors 413a, 413b, 413c are connected between the DC-to-AC converters 411a, 411b, 411c, with one DC-to-AC converter at either of the three split inductors 413a, 413b, 413c, and with the DC-to-AC converters 411a, 411b, 411c and split inductors 413a, 413b, 413c arranged in a ring. The DC-to-AC converters 411a, 411b, 411c have AC voltage inputs An, Bn, Cn. The split inductors 413a, 413b, 413c have center taps 421a, 421b, 421c, which are AC outputs An', Bn', Cn'. The split inductors 413a, 413b, 413c arranged in a ring provide a delta polyphase configuration. However, as a result of the use of the center taps 421a, 421b, 421c, the configuration is effectively that of six inductors 441, 442, 443, 444, 445, 446.

Since there are six inductors, or six inductor segments, 441, 442, 443, 444, 445, 446, there are inductors or inductor segments in an opposed relationship, as can be seen in FIG. 4. Mutual inductance inductive links 451a, 451b, 451c are configured as mutual inductances, and connect the inductor segments 441, 442, 443, 444, 445, 446 on opposite sides of the ring, so that each pair of inductor segments 441-444, 442-445, 443-446 connected by one of the mutual inductance inductive links 451a, 451b, 451c is separated (conductively) by two other inductor segments on either side.

The DC-to-AC converters 411a, 411b, 411c receive DC source power from DC source power units 415a, 415b, 415c at an optimum voltage for the DC source power units 415a, 415b, 415c. The DC source power is supplied at a voltage for each stage, so that in a multiple-stage cascaded configuration, DC inputs are at a voltage provided by the DC source power units 415a, 415b, 415c, with a corresponding AC output provided at each stage. As a result of the multiple stage cascaded configuration, the total AC output for all stages is at the AC output voltage, which is at an AC voltage multiple generally corresponding to the number of cascaded stages, minus conversion losses.

The voltage from the DC source power units 415a, 415b, 415c need not be a precise voltage, but can be within a voltage range, for example, an output range of a photovoltaic cell sub-array.

This configuration is convenient, in that it permits the DC-to-AC converters 411a, 411b, 411c to function as cascaded stages, thereby increasing voltage output without significantly increasing circuit complexity. In the case of photovoltaic arrays, sub-arrays are connected to individual stages, but the stages are cascaded, so that the output voltage is a function of the number of cascaded stages.

Figure 5A:
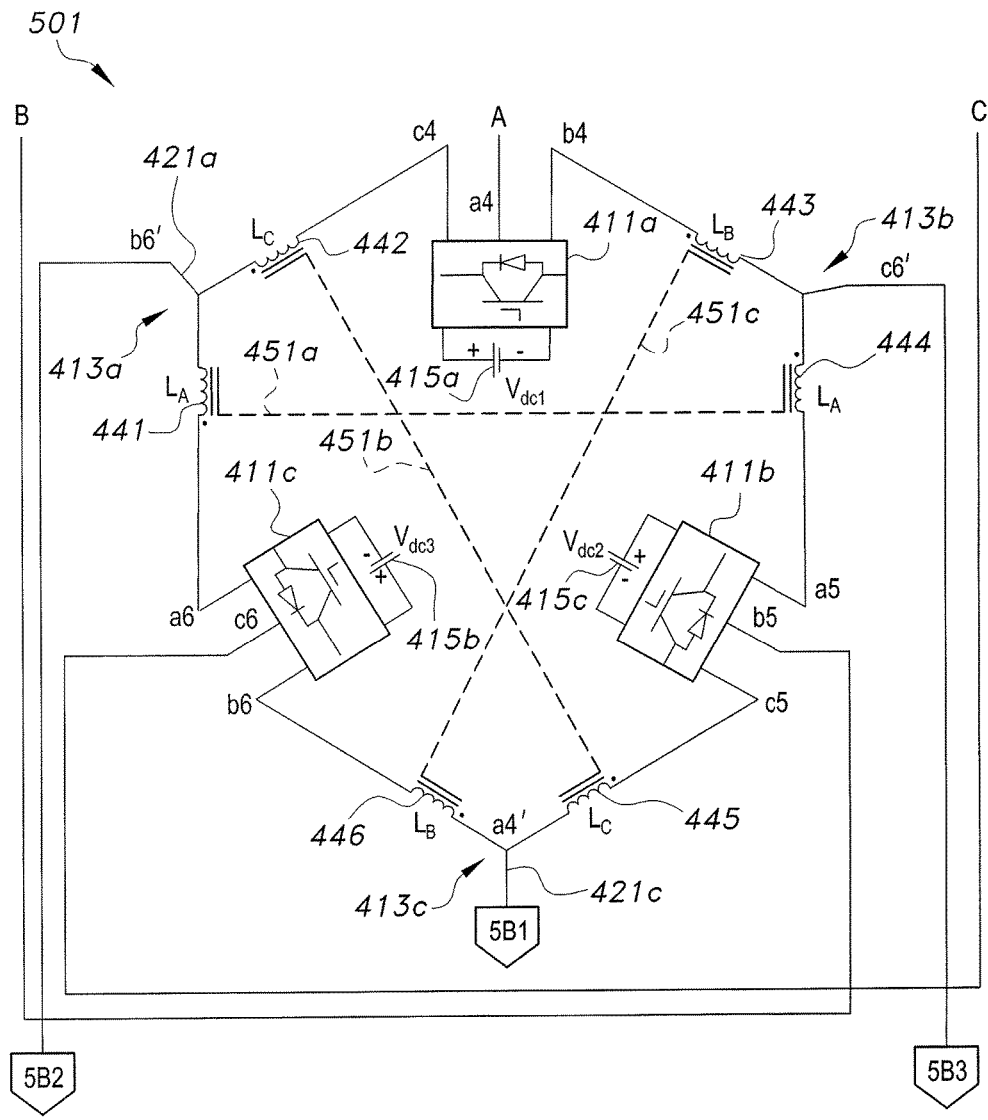
FIG. 5A and FIG. 5B are schematic diagrams depicting an exemplary configuration of a CHEX voltage source converter of the present disclosure.
Figure 5B:
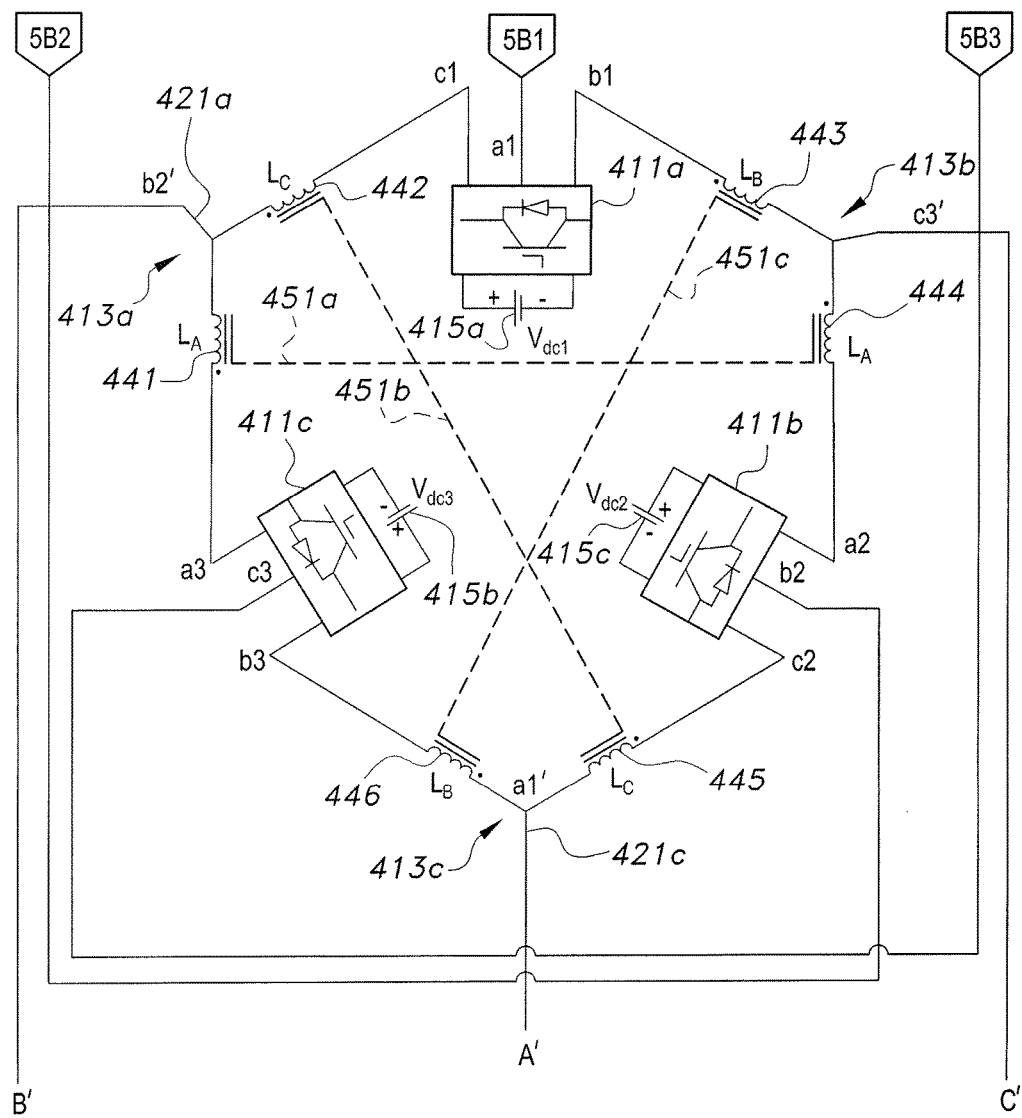

As shown in FIGS. 5A and 5B, the CHEX-VSC includes six three-phase VSC modules. Each VSC module supplies ⅙ of the CHEX-VSC output power. Each hexagonal cell includes three isolated DC voltage inputs provided by the DC source power units 415a, 415b, 415c, which may be represented as DC voltage inputs 1-1, 1-2 and 1-3 for the first cell 401 and DC voltage inputs 2-1, 2-2 and 2-3 for the second cell 501, as shown in FIG. 4. Each cell has six AC voltage outputs, such as a first AC voltage output a1, a1', b2, b2', c3 and c3' for the first cell 401 and a second AC voltage output a4, a4', b5, b5', c6 and c6' for the second cell 501.

The output terminal nodes of the CHEX converter modules are labeled A (AC terminal node a4 of module 4), B (AC terminal node b5 of module 5) and C (AC terminal node c6 of module 6). The other three-phase AC terminals are labeled A' (AC terminal node c2 of module 2 and b3 of module 3 are coupled by way of coupled inductor to form AC terminal node a1'), B' (AC terminal node c1 of module 1 and a3 of module 3 are coupled by way of coupled inductor to form AC terminal node b2') and C' (AC terminal node b1 of module 1 and a2 of module 2 are coupled by way of coupled inductor to form AC terminal node c3'). The other two AC terminal nodes b4 of module 4 and a5 of module 5 are coupled by way of coupled inductors with AC terminal node c3 of module 3. AC terminal nodes c4 of module 4 and a6 of module 6 are coupled by way of coupled inductors with AC terminal node b2 of module 2. Similarly, AC terminal nodes c5 of module 5 and b6 of module 6 are coupled by way of coupled inductors with AC terminal node a1 of module 1.

Figure 6A:
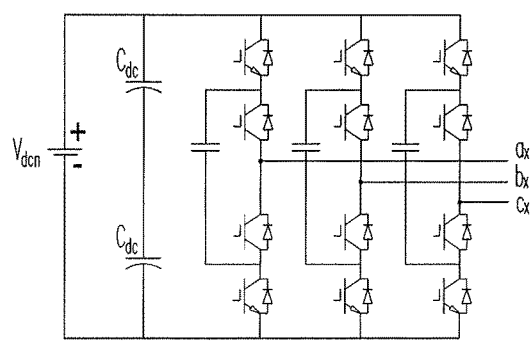
FIGS. 6A, 6B, and 6C are schematic diagrams depicting another exemplary configuration of a VSC module for a CHEX converter of the present disclosure.
Figure 6B:
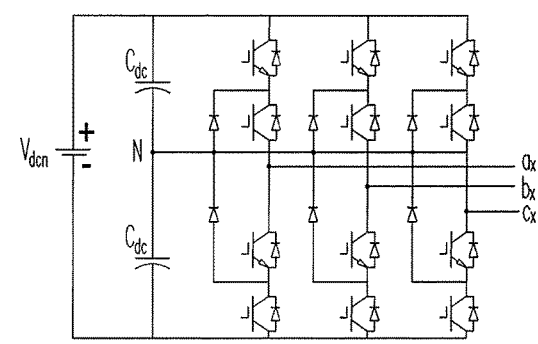
Figure 6C:
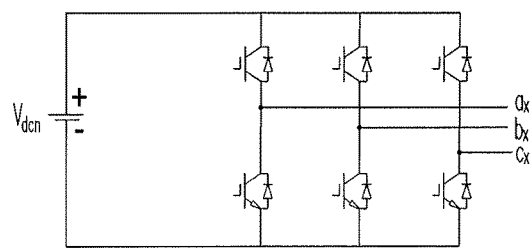

FIGS. 6A-6C are schematic diagrams depicting another exemplary configuration of a VSC module for the CHEX converter. The VSC modules shown in FIGS. 6A-6C are exemplary of the many different configurations in which VSC modules can be implemented. Actually, each VSC module can be configured as a different type of three-phase VSC converter. In general, the three-phase VSC module contains switches, diodes, and/or capacitors. The switches could be insulated gate bipolar transistors, integrated gate commutated thyristors, gate turn-off thyristors and the like. Each switch includes at least one input to receive the control signal generated by a controller for the converter, which will be described in more detail below.

The Cascade Hexagonal Voltage Source Converter (CHEX-VSC) has six output terminals and can be used either for six- or three-phase applications. A non-exhaustive list of applications includes power factor correction (PFC), distributed static VAR compensation (D-STATCOM), grid-connected inverters for renewable energy sources, active filters (AF), uninterruptible power supplies (UPS), variable speed drives (VSDs), back-to-back converters, and the like.

Figure 7:
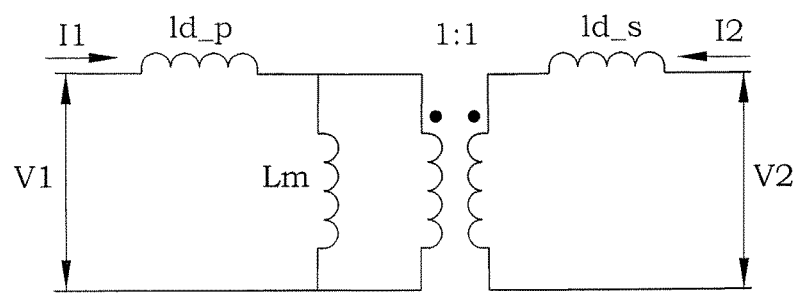
FIG. 7 is a circuit diagram depicting a coupled inductor equivalent circuit used in constructing a multilevel cascade hexagonal voltage source converter with isolated DC sources as described herein.

FIG. 7 is a circuit diagram depicting the coupled inductor equivalent circuit. A system analysis can be taken based on the function of the coupled inductor. Two inductors with an equal number of turns are coupled together, that is, the input to one side will produce an output on both, as shown in FIG.

7. Applying the voltage equations of coupled inductors, the following equations are given:

$$v_1 = L_{11}\frac{di_1}{dt} + L_{12}\frac{di_2}{dt}; \text{ and} \tag{1}$$

$$v_2 = L_{22}\frac{di_2}{dt} + L_{21}\frac{di_1}{dt}, \tag{2}$$

where $L_{22}=L_{11}=L_{d\_p}+L_m=L_{d\_s}+L_m$ and $L_m=L_{21}=L_{12}$; and $$i_1 = i_x + i_{cir}, \text{ and}$$

$$i_2 = -i_x + i_{cir},$$

where $i_x$ is the line current, $L_{d\_p}$ and $L_{d\_s}$ are the self-inductance of the primary and secondary windings, respectively, and $L_m$ is the magnetizing inductance of the coupled inductor.

It is obvious in FIG. 4 that the voltage drop on the coupled inductor is:

$$v = v_1 + v_2. \tag{3}$$

Using Equations 1, 2, and 3, the voltage across the coupled inductor can be expressed as:

$$v = (L_{d\_p} + L_m)\frac{d(i_x + i_{cir})}{dt} + L_m\frac{d(-i_x + i_{cir})}{dt} + (L_{d\_s} + L_m)\frac{d(-i_x + i_{cir})}{dt} + L_m\frac{d(i_x + i_{cir})}{dt} \tag{4}$$

$$v = (L_{d\_p} - L_{d\_s})\frac{d(i_x)}{dt} + (L_{d\_p} + L_{d\_s} + 4L_m)\frac{d(i_{cir})}{dt} \tag{5}$$

Therefore, the impedance in the line current path is $j\omega(L_{d\_p}-L_{d\_s})$, and the impedance to the circulating current is $j\omega(L_{d\_p}+L_{d\_s}+4L_m)$. Since the turns ratio of the coupled inductor is approximately 1:1, the self-inductances of the primary and secondary windings are the same $(L_{d\_p}=L_{d\_s}=L_d)$, and as a result, the impedance to the line current is roughly zero, and the impedance to the circulating current is approximately four times the magnetizing inductance.

FIGS. 5A and 5B are a Cascade Hexagonal Voltage Source Converter (CHEX-VSC) according to one configuration of the disclosed technology. The CHEX-VSC of FIGS. 5A and 5B are referred to as a two-cell CHEX converter (2C-CHEX), which includes two hexagonal cells 401, 501 connected in cascade. Each hexagonal cell 401, 501 supplies ½ of the CHEX output power, and each VSC module supplies ⅓ of the cell output power.

The phase currents of each VSC modules fulfill the following expressions:

$$\begin{bmatrix} i_{a1} + i_{b1} + i_{c1} \\ i_{a2} + i_{b2} + i_{c2} \\ i_{a3} + i_{b3} + i_{c3} \\ i_{a4} + i_{b4} + i_{c4} \\ i_{a5} + i_{b5} + i_{c5} \\ i_{a6} + i_{b6} + i_{c6} \end{bmatrix} = 0. \tag{6}$$

Assuming that the coupled inductor has large magnetizing inductance, the circulating currents in each hexagonal cell are suppressed to a low value and can be ignored, so that:

$$i_{b4}+i_{b6}+i_{c4}+i_{c5}+i_{a6}+i_{a5}=0$$

$$i_{b1}+i_{b3}+i_{c1}+i_{c2}+i_{a2}+i_{a3}=0. \tag{7}$$

Also, $$\begin{bmatrix} i_{c1} \\ i_{a2} \\ i_{b3} \\ i_{c4} \\ i_{a5} \\ i_{b6} \end{bmatrix} = \begin{bmatrix} i_{c2} \\ i_{a3} \\ i_{b1} \\ i_{c5} \\ i_{a6} \\ i_{b4} \end{bmatrix}. \tag{8}$$

The currents between each hexagonal cell within the 2C-CHEX converter have the following expressions:

$$\begin{bmatrix} i_{a1} \\ i_{b2} \\ i_{c3} \end{bmatrix} = -\begin{bmatrix} i_{c5} + i_{b6} \\ i_{c4} + i_{a6} \\ i_{b4} + i_{a5} \end{bmatrix}. \tag{9}$$

Suppose that the 2C-CHEX converter is connected to three-phase source/load, then, the currents at the output terminals will satisfy the following equation:

$$\begin{bmatrix} i_{a4} \\ i_{b5} \\ i_{c6} \end{bmatrix} = -\begin{bmatrix} i_{c2} + i_{b3} \\ i_{c1} + i_{a3} \\ i_{b1} + i_{a2} \end{bmatrix}. \tag{10}$$

Using equations (6), and (9)-(10), the output current of each VSC module can be shown to be:

$$\begin{bmatrix} i_{a1} \\ i_{b2} \\ i_{c3} \end{bmatrix} = \begin{bmatrix} i_{a4} \\ i_{b5} \\ i_{c6} \end{bmatrix} = \begin{bmatrix} i_{a1} \\ i_{b1} \\ i_{c1} \end{bmatrix} = \begin{bmatrix} i_{a2} \\ i_{b2} \\ i_{c2} \end{bmatrix} = \begin{bmatrix} i_{a3} \\ i_{b3} \\ i_{c3} \end{bmatrix} = \begin{bmatrix} i_{a4} \\ i_{b4} \\ i_{c4} \end{bmatrix} = \begin{bmatrix} i_{a5} \\ i_{b5} \\ i_{c5} \end{bmatrix} = \begin{bmatrix} i_{a6} \\ i_{b6} \\ i_{c6} \end{bmatrix} = \begin{bmatrix} i_A \\ i_B \\ i_C \end{bmatrix} = \begin{bmatrix} I\angle-\theta \\ I\angle-120-\theta \\ I\angle+120-\theta \end{bmatrix}, \tag{11}$$

where $(i_A, i_B, i_C)$, I and $\theta$ are CHEX-VSC output phase currents, the rms value of the output current and the phase angle, respectively. It can be deduced from Equation 11 that each VSC module within the 2C-CHEX converter will have the same currents under the symmetrical operation conditions.

Neglecting the voltage drop across the coupled inductor, which is small at the fundamental frequency, the output voltage of the 2C-CHEX converter is written as:

$$\begin{bmatrix} V_{AA'} \\ V_{BB'} \\ V_{CC'} \end{bmatrix} = \begin{bmatrix} V_{a4aa4'} \\ V_{b5b5'} \\ V_{c6c6'} \end{bmatrix} + \begin{bmatrix} V_{a1a1'} \\ V_{b2b2'} \\ V_{c3c3'} \end{bmatrix}. \tag{12}$$

The fundamental component (rms) of the phase voltages of each VSC module can be described as:

$$\begin{bmatrix} V_{a1o1} \\ V_{b1o1} \\ V_{c1o1} \end{bmatrix} = \begin{bmatrix} V_{a2o2} \\ V_{b2o2} \\ V_{c2o2} \end{bmatrix} = \begin{bmatrix} V_{a3o3} \\ V_{b3o3} \\ V_{c3o3} \end{bmatrix} = \begin{bmatrix} V_{a4o4} \\ V_{b4o4} \\ V_{c4o4} \end{bmatrix} = \begin{bmatrix} V_{a5o5} \\ V_{b5o5} \\ V_{c5o5} \end{bmatrix} = \begin{bmatrix} V_{a6o6} \\ V_{b6o6} \\ V_{c6o6} \end{bmatrix} = \begin{bmatrix} V\lfloor 0 \\ V\lfloor -120 \\ V\lfloor +120 \end{bmatrix}. \quad (13)$$

$$V = \frac{1}{2\sqrt{2}} V_{dc} m_a, \quad (14)$$

where V, $V_{dc}$ and $m_a$ are the rms value of the phase voltage of each VSC module, the DC-link of each VSC module, and the amplitude modulation index, respectively.

The three-phase voltages of each hexagonal cell within the 2C-CHEX converter is written as:

$$\begin{bmatrix} V_{a4a4'} \\ V_{b5b5'} \\ V_{c6c6'} \end{bmatrix} = \begin{bmatrix} V_{a4o4} - V_{c4o4} + V_{a6o6} - V_{b6o6} \\ V_{b5o5} - V_{c5o5} + V_{b6o6} - V_{a6o6} \\ V_{c6o6} - V_{a6o6} + V_{c4o4} - V_{b4o4} \end{bmatrix} \quad (15)$$

and $$\begin{bmatrix} V_{a1a1'} \\ V_{b2b2'} \\ V_{c3c3'} \end{bmatrix} = \begin{bmatrix} V_{a1o1} - V_{c1o1} + V_{a3o3} - V_{b3o3} \\ V_{b2o2} - V_{c2o2} + V_{b3o3} - V_{a3o3} \\ V_{c3o3} - V_{a3o3} + V_{c1o1} - V_{b1o1} \end{bmatrix}. \quad (16)$$

Using Equations 13 and 14, we have:

$$\begin{bmatrix} V_{a4a4'} \\ V_{b5b5'} \\ V_{c6c6'} \end{bmatrix} = \begin{bmatrix} 3V_{a4o4} \\ 3V_{b5o5} \\ 3V_{c6o6} \end{bmatrix} = \begin{bmatrix} 3V\lfloor 0 \\ 3V\lfloor -120 \\ 3V\lfloor +120 \end{bmatrix} \quad (17)$$

$$\begin{bmatrix} V_{a1a1'} \\ V_{b2b2'} \\ V_{c3c3'} \end{bmatrix} = \begin{bmatrix} 3V_{a1o1} \\ 3V_{b2o2} \\ 3V_{c3o3} \end{bmatrix} = \begin{bmatrix} 3V\lfloor 0 \\ 3V\lfloor -120 \\ 3V\lfloor +120 \end{bmatrix}$$

So, using Equations 12 and 17, the net output voltage of the 2C-CHEX converter under symmetrical operation conditions are written as:

$$\begin{bmatrix} V_{AA'} \\ V_{BB'} \\ V_{CC'} \end{bmatrix} = \begin{bmatrix} 6V\lfloor 0 \\ 6V\lfloor -120 \\ 6V\lfloor +120 \end{bmatrix} \quad (18)$$

Thus, Equation 18 demonstrates that the three-phase voltage of the 2C-CHEX converter is six times higher than the phase voltage of each VSC module. In other words, the voltage stress of the CHEX converter will be reduced six times.

For an NC-CHEX converter, the net three-phase voltage is written as:

$$\begin{bmatrix} V_{AA'} \\ V_{BB'} \\ V_{CC'} \end{bmatrix} = \begin{bmatrix} 3NV\lfloor 0 \\ 3NV\lfloor -120 \\ 3NV\lfloor +120 \end{bmatrix}. \quad (19)$$

The fundamental output volt-amperes (S) of each module within 2C-CHEX converter is given by:

$$\begin{bmatrix} S_1 \\ S_2 \\ S_3 \\ S_4 \\ S_5 \\ S_6 \end{bmatrix} = \begin{bmatrix} 3V_{a1o1} i_{a1} \\ 3V_{a2o2} i_{a2} \\ 3V_{a3o3} i_{a3} \\ 3V_{a4o4} i_{a4} \\ 3V_{a5o5} i_{a5} \\ 3V_{a6o6} i_{a6} \end{bmatrix}. \quad (20)$$

From Equations 11, 13 and 14, it can be shown that:

$$S_1 = S_2 = S_3 = S_4 = S_5 = S_6 = \frac{3}{2\sqrt{2}} V_{dc} m_a I. \quad (21)$$

Thus, Equation 21 demonstrates that each VSC module is equally loaded and fully utilized. Further, the total output volt-amperes ($S_{total}$) of the 2C-CHEX converter is given by:

$$S_{total} = 3V_{AA'} i_A = \frac{18}{2\sqrt{2}} V_{dc} m_a I. \quad (22)$$

For the NC-CHEX converter, the total output volt-amperes ($S_{total}$) is written as:

$$S_{total} = 3V_{AA'} i_A = \frac{9N}{2\sqrt{2}} V_{dc} m_a I. \quad (23)$$

Comparing Equations 21 and 23, it is clear that the total volt-ampere of NC-CHEX converter is 3N times the volt-amperes rating of each VSC module. Moreover, the instantaneous power of each VSC module is constant, so that the storage requirement is reduced.

According to FIG. 3, the line-to-line voltages of the NC-CHEX converter are written as:

$$\begin{bmatrix} U_{AB} \\ U_{BC} \\ U_{CA} \end{bmatrix} = \begin{bmatrix} E_{AB} \\ E_{BC} \\ E_{CA} \end{bmatrix} + j\omega L_f \begin{bmatrix} I_A \\ I_B \\ I_C \end{bmatrix} - j\omega L_f \begin{bmatrix} I_B \\ I_C \\ I_A \end{bmatrix}, \quad (24)$$

where, ($E_{AB}$, $E_{BC}$, $E_{CA}$) are the rms values of grid line-to-line voltages, ($U_{AB}$, $U_{BC}$, $U_{CA}$) and ($I_A$, $I_B$, $I_C$) are the rms of line-to-line voltages and the rms values of the output current of NC-CHEX, respectively, and $L_f$ is the AC side filtering inductance.

Using the voltage relationship demonstrated in Equation 19, the rms value of NC-CHEX line-to-line voltages can be expressed as:

$$\begin{bmatrix} U_{AB} \\ U_{BC} \\ U_{CA} \end{bmatrix} = \begin{bmatrix} V_{AA'} - V_{BB'} \\ V_{BB'} - V_{CC'} \\ V_{CC'} - V_{AA'} \end{bmatrix} = \begin{bmatrix} 3N\sqrt{3}\lfloor -30 \\ 3N\sqrt{3}\lfloor -150 \\ 3N\sqrt{3}\lfloor +90 \end{bmatrix}, \quad (25)$$

where $V_{AA'}$, $V_{BB'}$ and, $V_{CC'}$ are the net three-phase voltage of NC-CHEX converter.

When the conversion powers of each VSC modules within NC-CHEX converter are balanced, the 3N groups of DC-links voltages is equal to $V_{DC\_av}$, so that:

$$V_{DC_{av}} = V_{DC1_1} = V_{DC1_2} = V_{DC1_3} = V_{DC2_1} = V_{DC2_2} = V_{DC2_3} \ldots$$
$$= V_{DCN_1} = V_{DCN_2} = V_{DCN_3}$$
$$= \frac{V_{DC1\_1} + V_{DC1\_2} + V_{DC1\_3} \ldots + V_{DCN\_1} + V_{DCN\_2} + V_{DCN\_3}}{3N}.$$

Also, the 3N groups of DC-link voltages can be expressed as:

$$U_{DC\_eq} = 3NV_{DC\_av}. \quad (26)$$

If each VSC within NC-CHEX converter implements the same modulation strategy, the rms value of NC-CHEX phase voltages can be expressed as:

$$V = \frac{1}{2\sqrt{2}} U_{DC\_eq} m_a. \quad (27)$$

Figure 8:
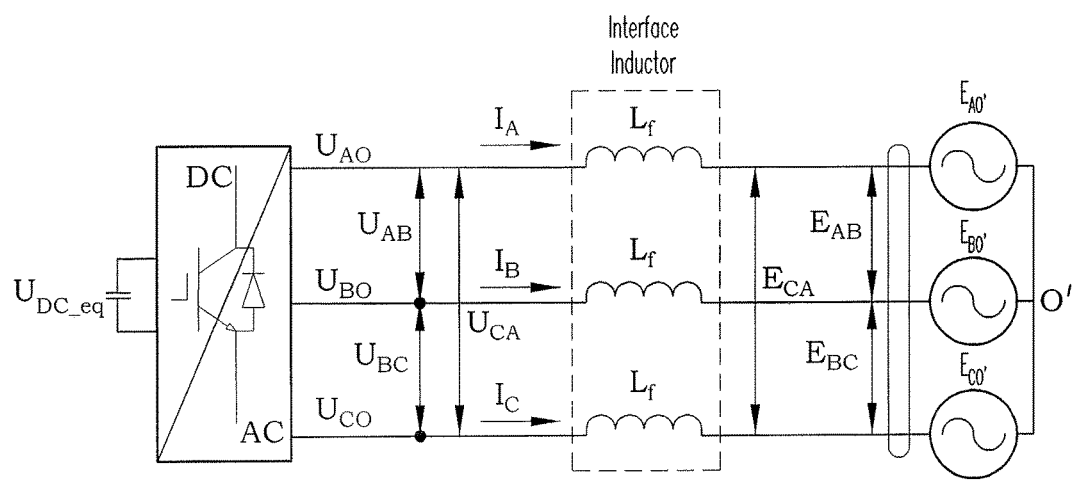
FIG. 8 is a circuit diagram illustrating an equivalent circuit of a CHEX-VSC of the present disclosure.

FIG. 8 is a circuit diagram illustrating the equivalent circuit model of CHEX-VSC. Using equations 24-27, the NC-CHEX converter can be modeled as a conventional three-phase two-level VSC, as shown in FIG. 8.

The purpose of the controller is to generate reference currents such that the NC-CHEX provides only available active power at the DC links to the grid at the point of common coupling (PCC). Using the equivalent circuit model presented in FIG. 8 and applying Kirchhoff's voltage and current laws at the PCC, the following two equations in abc frame can be written:

$$\begin{bmatrix} E_{AO'} \\ E_{BO'} \\ E_{CO'} \end{bmatrix} = \begin{bmatrix} U_{AO} \\ U_{BO} \\ U_{CO} \end{bmatrix} + L_f \frac{d}{dt} \begin{bmatrix} I_A \\ I_B \\ I_C \end{bmatrix} + U_{O'O} \text{ and} \quad (28)$$

$$C_{eq} \frac{dU_{DC\_av}}{dt} = [S_A \ S_B \ S_C] \begin{bmatrix} I_A \\ I_B \\ I_C \end{bmatrix}, \quad (29)$$

where $S_A$, $S_B$, $S_C$ represents the equivalent switching states of the equivalent circuit model under balance conditions.

Assuming that the voltages are balanced and the zero-sequence components is zero, the voltage between neutral virtual point of equivalent circuit model (O) and grid neutral point (O') is given using the following form:

$$U_{O'O} = -\frac{(U_{AO} + U_{BO} + U_{CO})}{3} \text{ and} \quad (30)$$

$$\begin{bmatrix} U_{AO} \\ U_{BO} \\ U_{CO} \end{bmatrix} = U_{DC\_av} \begin{bmatrix} S_A \\ S_B \\ S_C \end{bmatrix}. \quad (31)$$

Substituting Equation 31 into Equations 28 and 30, the following relation is obtained:

$$\frac{d}{dt} \begin{bmatrix} I_A \\ I_B \\ I_C \end{bmatrix} = \frac{1}{L_f} \begin{bmatrix} E_{AO'} \\ E_{BO'} \\ E_{CO'} \end{bmatrix} - \frac{U_{DC_{av}}}{L_f} \left( \begin{bmatrix} S_A \\ S_B \\ S_C \end{bmatrix} - \frac{1}{3} [S_A \ S_B \ S_C] \begin{bmatrix} 1 \\ 1 \\ 1 \end{bmatrix} \right). \quad (32)$$

Equation 32 depicts the abc dynamic model of the equivalent circuit for NC-CHEX converter. The switching state function $d_i$ (i=A, B, C) may be defined as:

$$\begin{bmatrix} d_A \\ d_B \\ d_C \end{bmatrix} = \left( \begin{bmatrix} S_A \\ S_B \\ S_C \end{bmatrix} - \frac{1}{3} [S_A \ S_B \ S_C] \begin{bmatrix} 1 \\ 1 \\ 1 \end{bmatrix} \right). \quad (33)$$

Consequently, the dynamic model of the equivalent circuit model in the abc frame is achieved by combining Equations 34 and 33, as follows:

$$L_f \frac{d}{dt} \begin{bmatrix} I_A \\ I_B \\ I_C \end{bmatrix} = \begin{bmatrix} E_{AO'} \\ E_{BO'} \\ E_{CO'} \end{bmatrix} - U_{DC_{av}} \begin{bmatrix} d_A \\ d_B \\ d_C \end{bmatrix}. \quad (34)$$

The DC side differential equation can be written as:

$$\frac{dU_{DC\_av}}{dt} = \frac{1}{C_{eq}} I_{dc} = [d_A \ d_B \ d_C] \begin{bmatrix} I_A \\ I_B \\ I_C \end{bmatrix}. \quad (35)$$

Under balance conditions ($I_A + I_B + I_C = 0$) the DC side differential equation is expressed as:

$$\frac{dU_{DC\_av}}{dt} = \frac{1}{C_{eq}} (2d_A + d_B) I_A + \frac{1}{C_{eq}} (d_A + 2d_B) I_B \quad (36)$$

It can be seen that Equations 35 and 36 are time varying models. To facilitate the control algorithm, the model can be converted to the synchronous reference frame rotating at the constant frequency ω. The conversion matrix is:

$$C_{dq}^{abc} = \sqrt{\frac{2}{3}} \begin{bmatrix} \cos\theta & \cos(\theta - 2\pi/3) & \cos(\theta - 4\pi/3) \\ -\sin\theta & -\sin(\theta - 2\pi/3) & -\sin(\theta - 4\pi/3) \end{bmatrix}, \quad (37)$$

where B=ωt.

Applying the coordinate transformation, Equation 36 is rewritten as:

$$L_f \frac{d}{dt} \begin{bmatrix} I_d \\ I_q \end{bmatrix} = \begin{bmatrix} E_d \\ E_q \end{bmatrix} + L_f \omega \begin{bmatrix} I_q \\ -I_d \end{bmatrix} - U_{DC_{av}} \begin{bmatrix} d_d \\ d_q \end{bmatrix}. \quad (38)$$

Applying this transformation into Equation 36, we obtain:

$$C_{eq} \frac{dU_{DC\_av}}{dt} = d_d I_d + d_q I_q. \quad (39)$$

The model represented by Equations 38 and 39 is nonlinear due to the multiplication between the state variable ($I_d$, $I_q$, $U_{DC\_av}$) and the inputs ($d_d$, $d_q$).

Figure 9A:
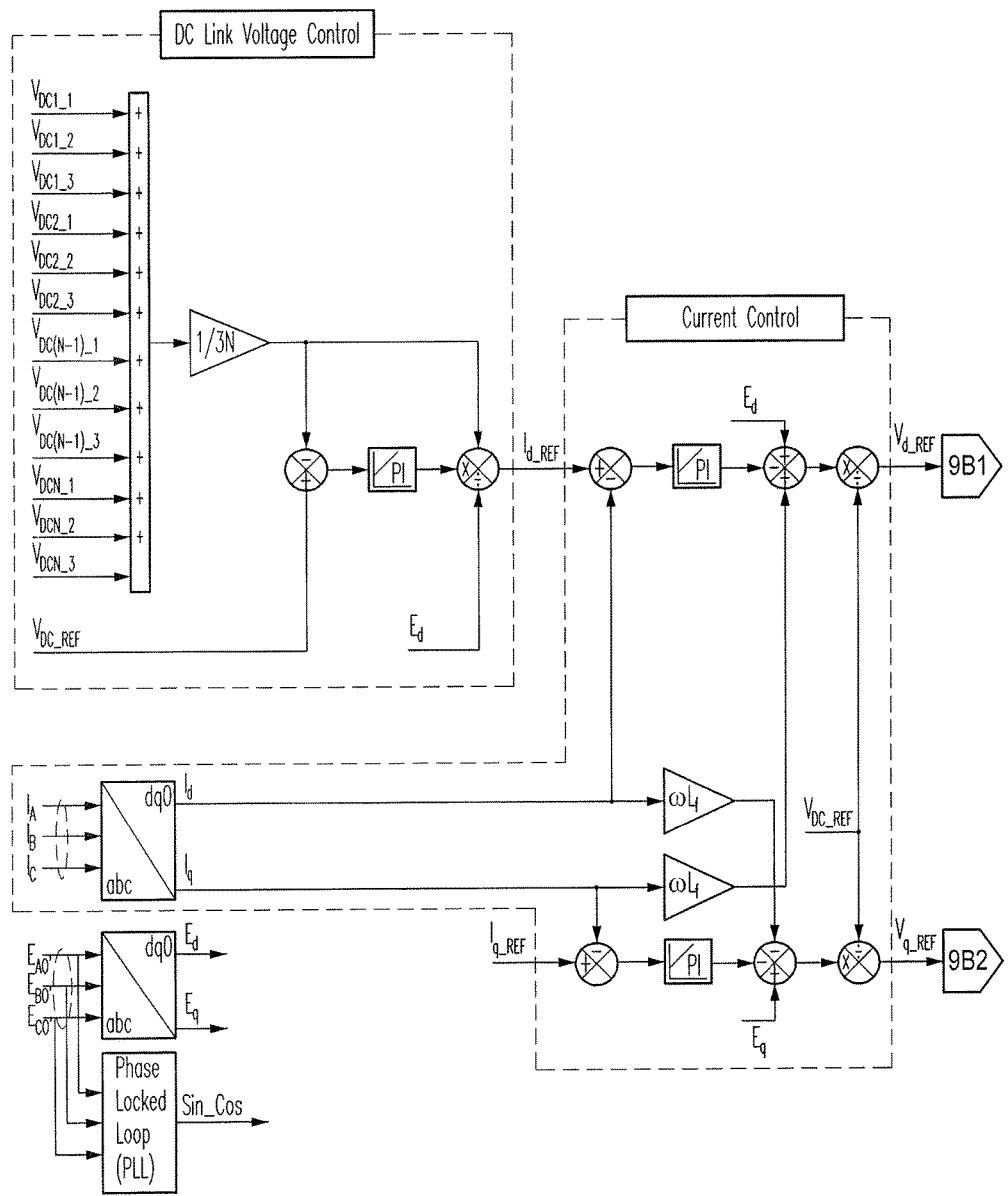
FIG. 9A and FIG. 9B are a block diagram depicting an exemplary configuration of a controller for the CHEX converter of the present disclosure.
Figure 9B:
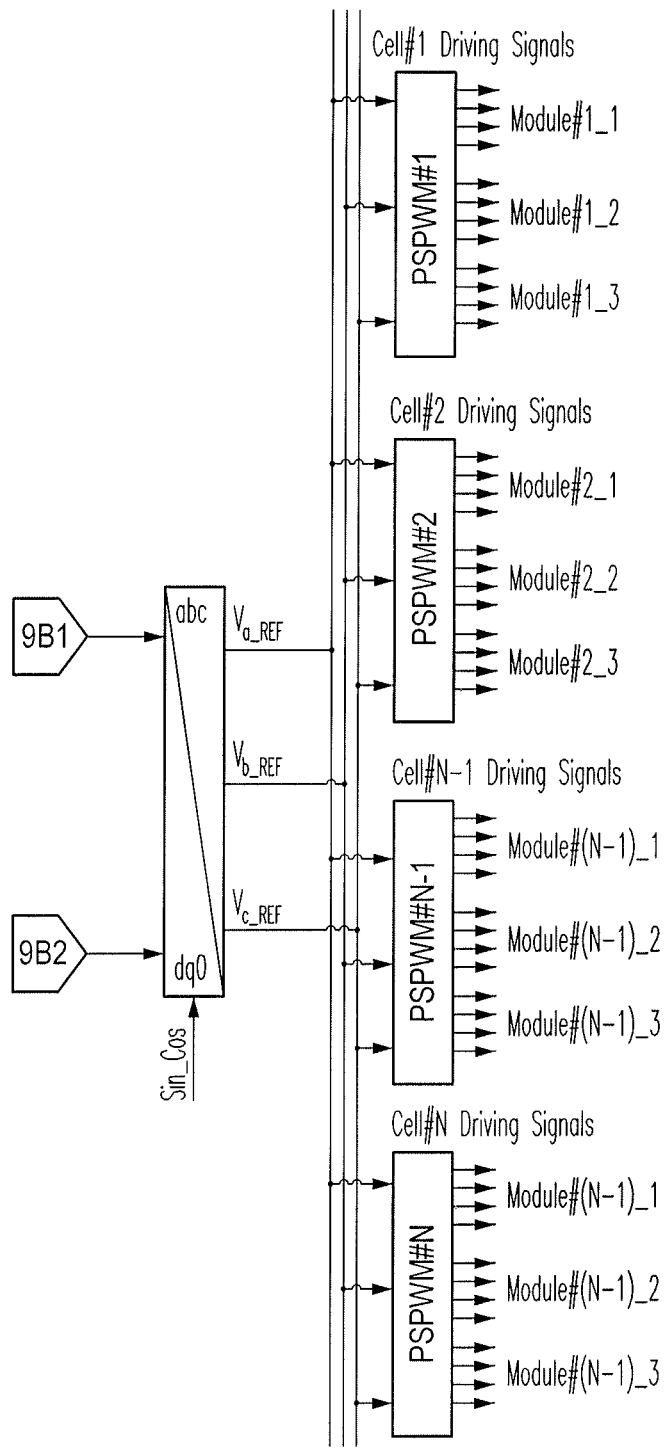

FIGS. 9A and 9B are a block diagram depicting an exemplary embodiment of a controller for the CHEX converter. FIGS. 9A and 9B demonstrate the control principle of the NC-CHEX converter. Since the proposed configuration is three wires system, only two phase currents required to be measured. The NC-CHEX currents $I_A$, $I_B$ are measured and converted to the dq0 frame to obtain their corresponding currents $I_d$, $I_q$. Accordingly, equation 38 is rewritten as follows:

$$L_f \begin{bmatrix} u_d \\ u_q \end{bmatrix} = \begin{bmatrix} E_d \\ E_q \end{bmatrix} + L_f \omega \begin{bmatrix} I_q \\ -I_d \end{bmatrix} - U_{DC_{av}} \begin{bmatrix} d_d \\ d_q \end{bmatrix}, \quad (40)$$

where $$\begin{bmatrix} u_d \\ u_q \end{bmatrix} = \frac{d}{dt} \begin{bmatrix} I_d \\ I_q \end{bmatrix}.$$

Equation 40 demonstrates that the currents ($I_d$, $I_q$) can be controlled independently by acting upon the inputs ($u_d$, $u_q$), respectively. Hence the controller is assembled using the following expressions:

$$u_d = k_p \tilde{\iota}_d + k_i \int \tilde{\iota}_d \, dt$$

$$u_q = k_p \tilde{\iota}_q + k_i \int \tilde{\iota}_q \, dt \quad (41)$$

where $\tilde{\iota}_d = I_{d\_REF} - I_d$ and $\tilde{\iota}_q = I_{q\_REF} - I_q$ are the current error signals and ($I_{d\_REF}$, $I_{d\_REF}$ are the reference values of ($I_d$, $I_d$).

Using Equation 40, the current control law is given by the following expression:

$$\begin{bmatrix} d_d \\ d_q \end{bmatrix} = \frac{L_f \omega}{U_{DC_{av}}} \begin{bmatrix} I_q \\ -I_d \end{bmatrix} + \frac{1}{U_{DC_{av}}} \begin{bmatrix} E_d \\ E_q \end{bmatrix} - \frac{L_f}{U_{DC_{av}}} \begin{bmatrix} u_d \\ u_q \end{bmatrix}. \quad (42)$$

For unity power factor, the quadrature-axis reference current is set to be zero $i_{q\_REF} = 0$. The active power exchange between DC links and the source is directly proportional to the direct-axis current $I_d$ and can be expressed as:

$$P_{dc} = \frac{3}{2}(E_d I_d + E_q I_q) = \frac{3}{2} E_d I_d. \quad (43)$$

Equation 43 shows that the direct-axis current $I_d$ is responsible for maintaining the DC links voltages at a desired value. Thus, using Equation 39, one deduces:

$$C_{eq} \frac{dU_{DC\_av}}{dt} = d_d I_d = u_{dc}. \quad (44)$$

Thus, the active current of the CHEX-VSC is:

$$I_d = \frac{u_{dc}}{d_d} = \frac{u_{dc} V_{DC\_av}}{d_d V_{DC\_av}}. \quad (45)$$

Assuming that the current loop is perfect and assuming that the NC-CHEX works under balance conditions, the following quantities hold:

$$d_d V_{DC\_av} = E_d, \quad (46)$$

$$I_d = \frac{u_{dc}}{d_d} = \frac{u_{dc} V_{DC\_av}}{E_d}, \text{ and} \quad (47)$$

$$\begin{bmatrix} E_d \\ E_q \end{bmatrix} = \sqrt{\frac{3}{2}} \begin{bmatrix} \hat{V} \\ 0 \end{bmatrix}, \quad (48)$$

where $\hat{V}$ and $E_d$ are the rms voltage and the direct-axis of the phase voltages at PCC point, respectively.

Thus, the control effort of the DC link voltage loop is given by:

$$I_{d\_REF} = \frac{u_{dc}}{d_d} = \sqrt{\frac{2}{3}} \frac{V_{DC\_av}}{\hat{V}} u_{dc}. \quad (49)$$

To control the DC links voltage, the error $\tilde{V}_{dc} = V_{DC\_REF} - V_{DC\_av}$ is passed through a PI controller expressed as:

$$u_{dc} = k_{pdc} \tilde{V}_{dc} + k_{idc} \int \tilde{V}_{dc} \, dt, \quad (50)$$

where $\tilde{V}_{dc} = V_{DC\_REF} - V_{DC\_av}$ is the DC link voltage error signals and ($V_{DC\_REF}, V_{DC\_av}$) are the DC link voltage reference and DC links average, respectively. The sum of the DC-link reference voltages is compared to the sum of the measured DC-link voltages, and the error is used in a PI controller to determine the control parameter $u_{dc}$.

The proposed topology is a modular type. Therefore, it can be extended to any levels. Equations 51, 52, and 53 provide the relations of the proposed topology as:

$$M_{level} = 8 N_{Hex\_cell} + 1, \quad (51)$$

$$N_{switches} = 2.25(M_{level} - 1), \text{ and} \quad (52)$$

$$N_{DC-links} = 3 N_{Hexcell}. \quad (53)$$

Figure 10:
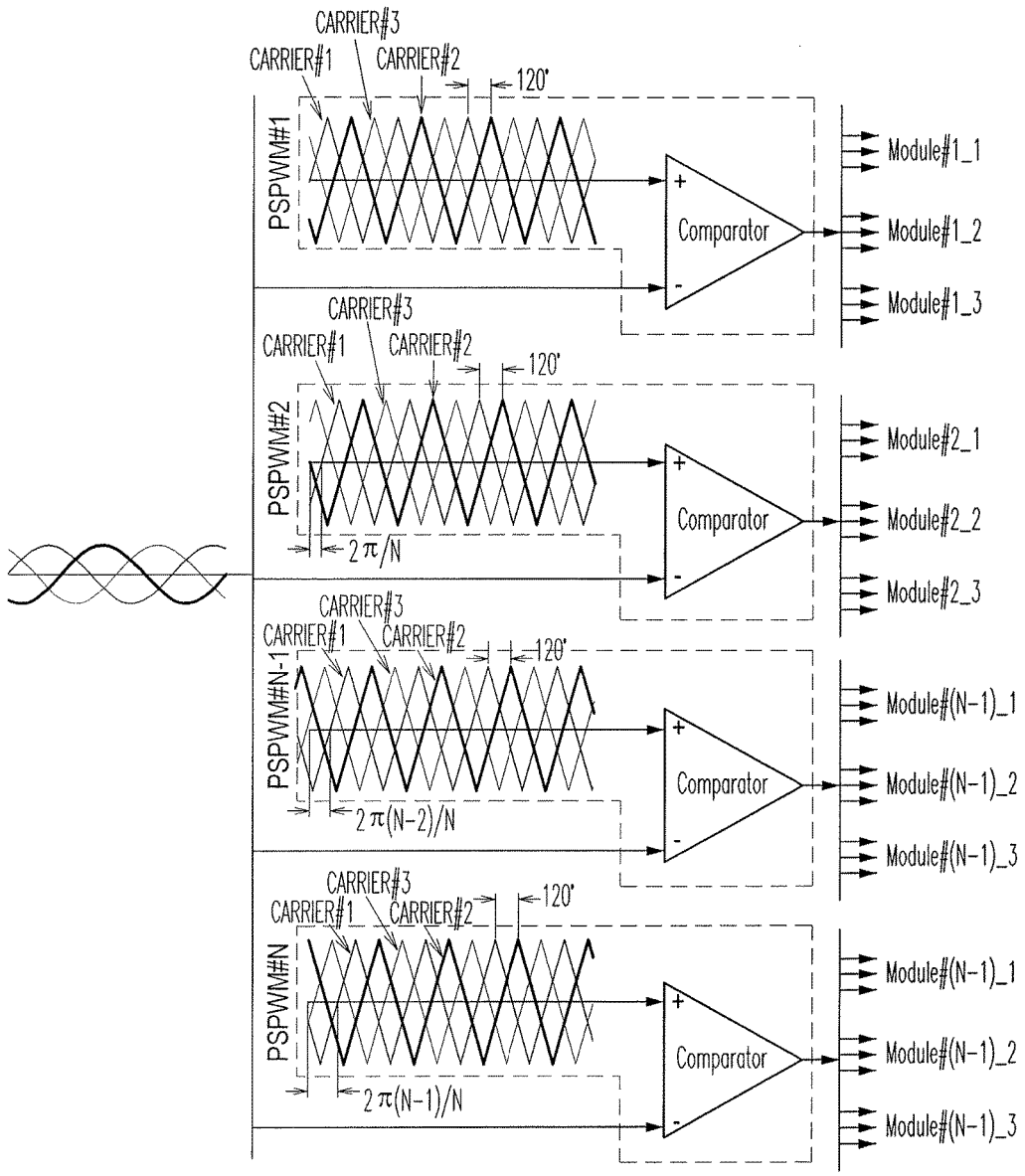
FIG. 10 is a schematic view depicting the PS-SPWM diagram for the CHEX converter of FIG. 9.

FIG. 10 is a schematic view depicting the PS-SPWM diagram for the CHEX converter. To obtain an output voltage with low total harmonic distortion (THD), multicarrier phase shifted sinusoidal pulse width modulation (PS-SPWM) switching strategy is applied to drive the IGBTs in the NC-CHEX converter. Optimum harmonic cancellation is accomplished by shifting each carrier cell by $2\pi T_s/NT$ in sequence, where $T_s$ is the switching time and T is one cycle modulation time and N is the number of series hexagonal cell. The carrier phases of each module in each hexagonal cell are delayed by 120° in sequence. FIG. 10 shows the relationship between the modulation waveforms and the three groups of carriers within each hexagonal cell.

Figure 11:
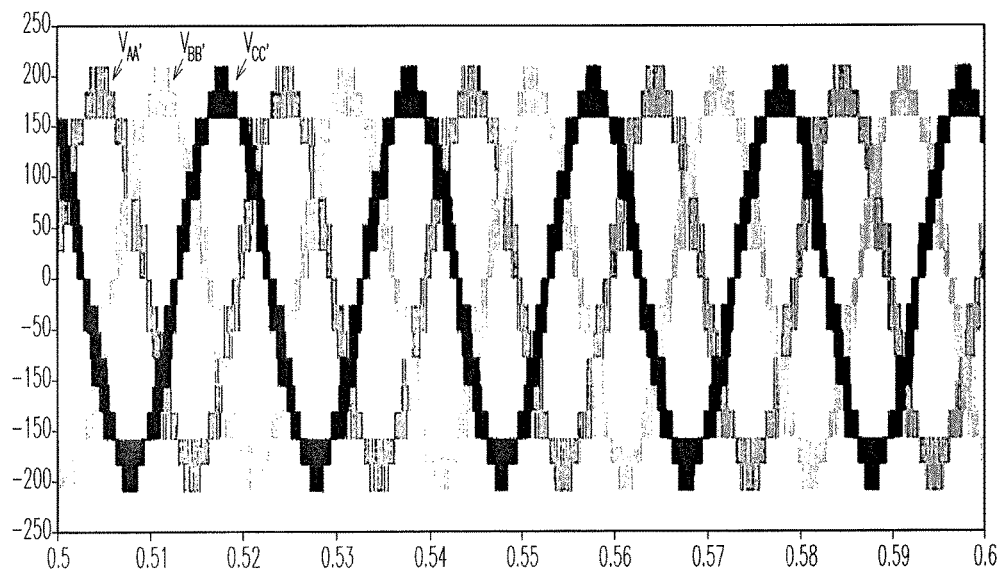
FIG. 11 is a graph showing the output phase voltage for the circuit of FIG. 5.
Figure 12:
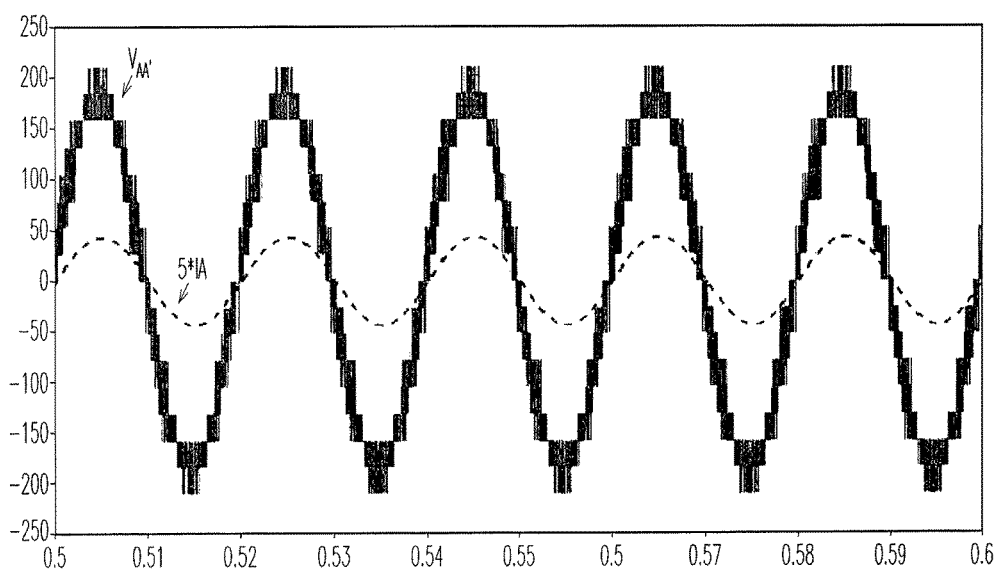
FIG. 12 is a graph showing the output phase voltage and the line current of a CHEX-VSC of the present disclosure.
Figure 13:
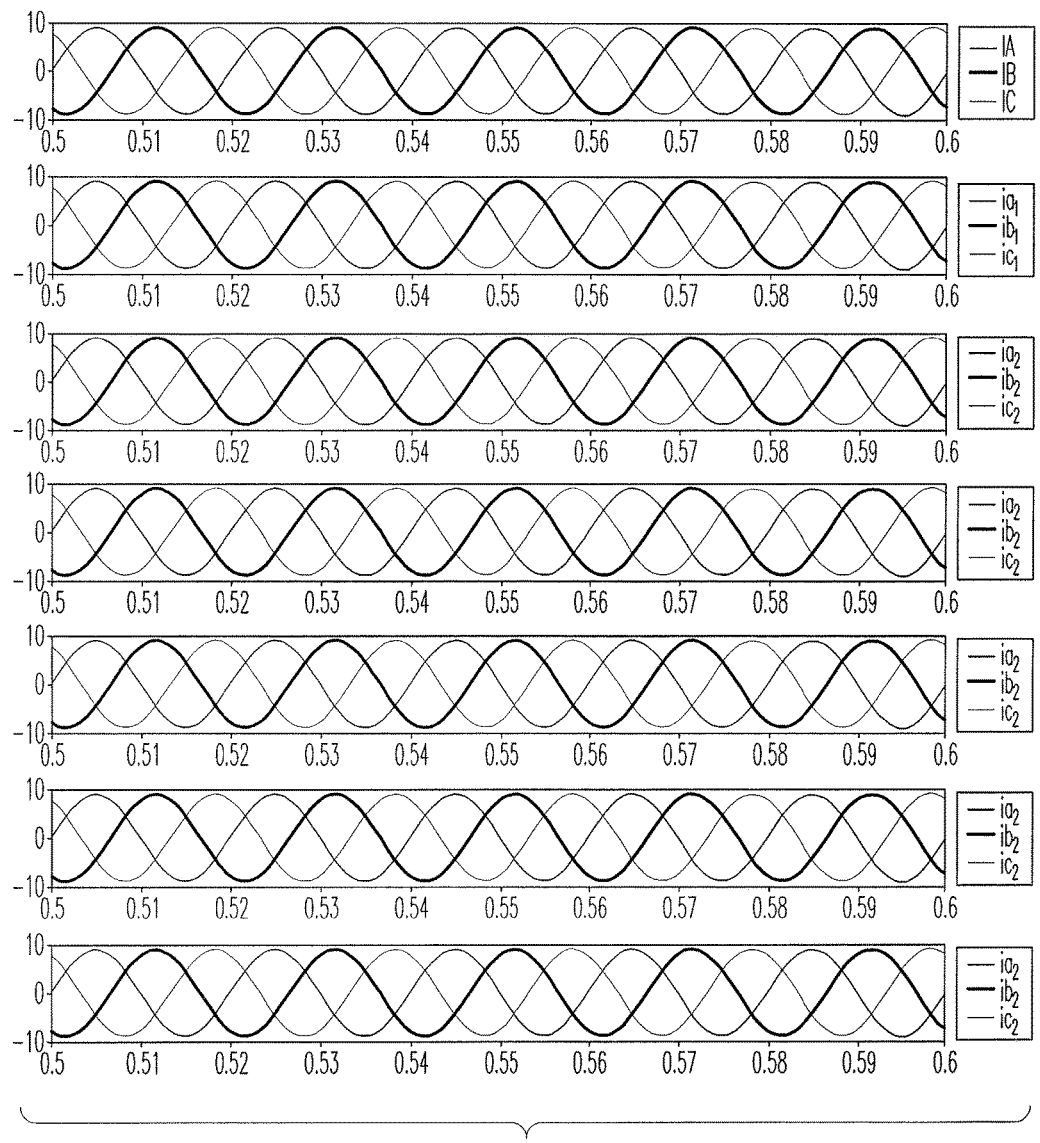
FIG. 13 is a graph showing the line current and the currents inside the CHEX converter of the present disclosure.

The circuit output provides smooth polyphase outputs, which are provided as three-phase current. FIG. 11 is a graph showing the output phase voltage for the circuit of FIG. 5. FIG. 12 is a graph showing the output phase voltage and the line current. FIG. 13 is a graph showing the line current and the currents inside the CHEX converter.

Figure 14:
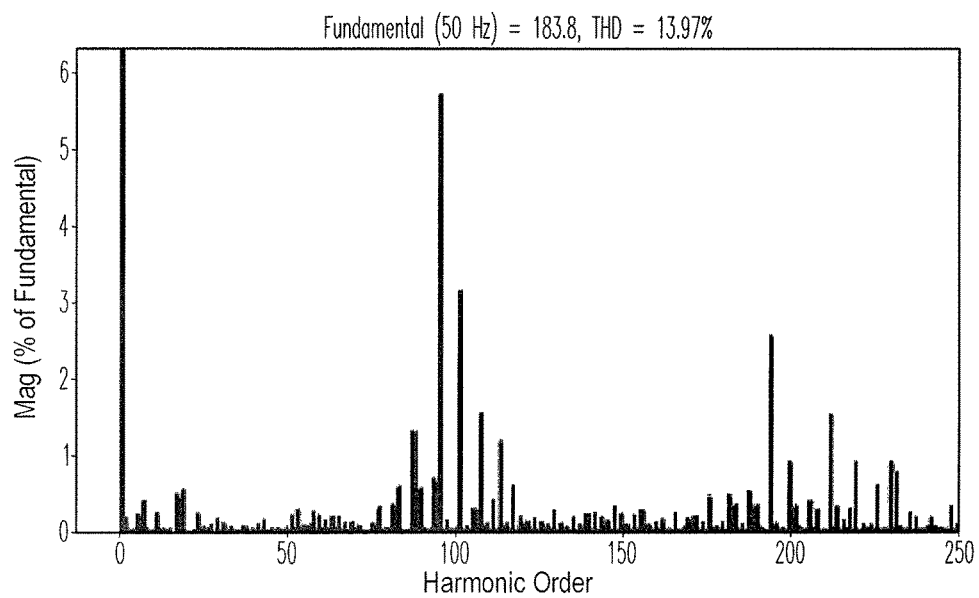
FIG. 14 is a graph showing the harmonic contents of the output phase voltage for a CHEX converter of the present disclosure.
Figure 15:
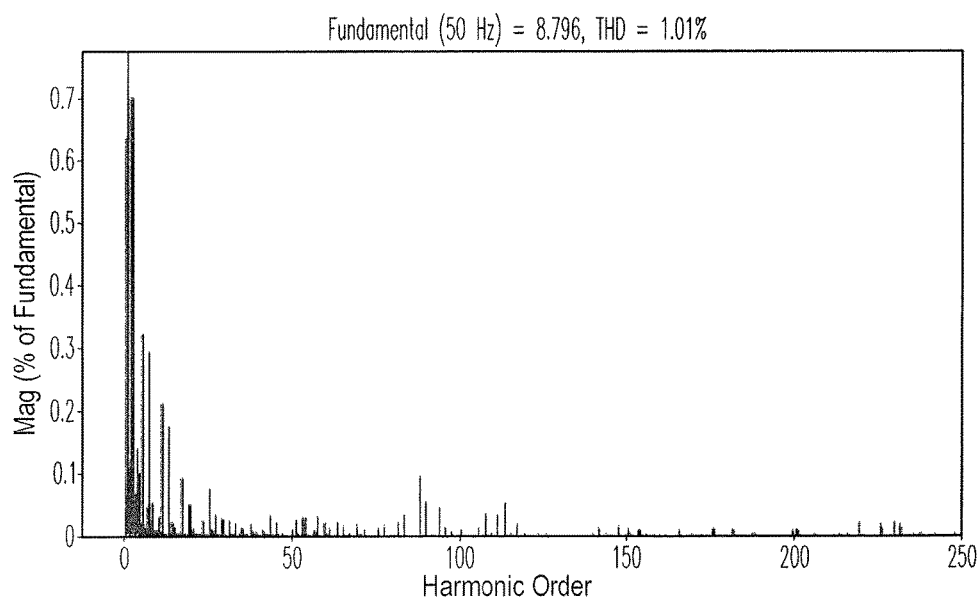
FIG. 15 is a graph showing the harmonic contents of the line current for a CHEX converter of the present disclosure.

The use of conversion circuitry, including the CHEX converter, does result in harmonics. FIG. 14 is a graph showing the harmonic contents of the output phase voltage. FIG. 15 is a graph showing the harmonic contents of the line current. These harmonics are limited and easily smoothed in a three-phase power system.

As a conceptual example, the disclosed technology can be used to provide household mains current using photovoltaic power sources, as depicted in Table 1:

TABLE 1

Household Mains Values Using PV Source

| Parameter | Value |
|---|---|
| Nominal power | P = 2.4 kVA |
| Line voltage and frequency | $V_{ph}$ = 220 V (rms), $f_{sys}$ = 50 Hz |
| Output current | Iout = 8.8 A (rms) |
| Dc bus voltages | $V_{dc1}$ = $V_{dc2}$ = $V_{dc3}$ = $V_{dc4}$ = $V_{dc5}$ = $V_{dc6}$ = 52.6 V |
| Open-end winding transformers | $V_{pri}/V_{sec}$ = 1, $f_{tran}$ = 50 Hz |
| Current controller parameters | $K_p$ = 55, $K_i$ = 0.001 |
| Voltage controller parameters | $K_p$ = 3, $K_i$ = 20 |
| Switching frequency | $f_{sys}$ = 2500 Hz |

This configuration is attained with a reasonably low circuit component count, as depicted in Table 3, in which the last column ("CHEX") indicates the component count of the present configuration:

TABLE 2

Number of Components for Household Configuration

|  | NPC | FC | CHB | CHEX |
|---|---|---|---|---|
| DC-Link Capacitors | 16 | 16 | 24 | 6 |
| Floating Capacitors | 0 | 360 | 0 | 0 |
| Inductors | 0 | 0 | 0 | 6 |
| Clamping Diodes | 720 | 0 | 0 | 0 |
| Switches | 96 | 96 | 96 | 36 |

It is to be understood that the multilevel cascade hexagonal voltage source converter with isolated dc sources is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A multilevel cascade hexagonal voltage source converter (VSC) comprising a plurality of polyphase stages, each of the polyphase stages having:
a plurality of n AC inputs corresponding to a number of phases, and a numerically identical plurality of n outputs, the outputs of one of the polyphase stages being connected to the inputs of a next polyphase stage in order to connect the polyphase stages in cascade;
a plurality of n DC-to-AC converters corresponding to the number of phases, each of the n DC-to-AC converters being connected to one of the n AC inputs corresponding to a respective phase so that the n DC-to-AC converters provide n DC-to-AC electrical conversions at the corresponding respective phase of their respective n AC inputs and cascades AC current received at the inputs connected to then DC-to-AC converters, each of the n DC-to-AC converters providing two AC outputs;
a connection for receiving DC power and amplifying its AC outputs with the received DC power;
the multilevel cascade hexagonal voltage source converter (VSC) further having a plurality of n split inductors, each n split inductor having two end terminals and a center tap terminal, the n split inductor on respective sides of the center tap terminal forming inductor half-segments, the AC outputs of the n DC-to-AC converters being connected to adjacent ones of the n split inductors at respective ones of the two end terminals, whereby the n DC-to-AC converters establish a polyphase ring connection, the plurality of n split inductors having inductive cross-coupling links, the inductive cross-coupling links being inductively connected to the inductor half-segments at opposite sides of the polyphase ring connection, the center tap terminals of the n split inductors providing n AC outputs for its respective polyphase stage.

2. The multilevel cascade hexagonal voltage source converter (VSC) of claim 1, wherein n=3, whereby the plurality of polyphase stages each consists of a three-phase stage and the n split inductors to form the inductor half-segments.

3. The multilevel cascade hexagonal voltage source converter (VSC) of claim 1, wherein n=3, whereby the plurality of polyphase stages each consists of a three-phase stage, providing a delta configuration output at the center tap terminal.

4. The multilevel cascade hexagonal voltage source converter (VSC) of claim 1, wherein n=3, whereby the plurality of polyphase stages each consists of a three-phase stage, the n split inductors forming pairs of inductor half-segments and three pairs of mutual inductance inductive links, each pair of the inductor half-segments being connected by one of the pairs of mutual inductance inductive links and electrically separated by two of the other inductor half-segments on either side of the mutual inductance inductive links.

5. The multilevel cascade hexagonal voltage source converter (VSC) of claim 1, wherein each of the n DC-to-AC converter receives DC power supplied at a predetermined preferred voltage range at the connection for receiving the DC power, so that in a multiple-stage cascaded configuration, the VSC receives DC inputs at a preferred voltage for the DC power and a corresponding AC output is provided at each of the stages, the plurality of polyphase stages providing a total AC output for all polyphase stages at a preferred AC output voltage, the preferred AC output voltage being a multiple of the cascaded polyphase stages, minus conversion losses.

6. A method of providing DC-to-AC voltage conversion, comprising the steps of:
providing a plurality of polyphase stages, each of the polyphase stages having a plurality of n AC inputs corresponding to a number of phases, and a numerically identical plurality of n outputs;
connecting outputs of one polyphase stage to inputs of a next polyphase stage in order to connect the polyphase stages in cascade, each of the polyphase stages having a plurality of n DC-to-AC converters corresponding to the number of phases;
connecting then DC-to-AC converters to each other with a plurality of n split inductors;
supplying the plurality of n DC-to-AC converters with DC power at a predetermined preferred voltage range for the DC power;
using center taps of the n split inductors as AC outputs;
providing a plurality of n split inductors, each n split inductor having two end terminals and a center tap terminal, the n split inductor on respective sides of the center tap terminal forming inductor half-segments, the AC outputs of the n DC-to-AC converters being connected to adjacent ones of the n split inductors at respective ones of the two end terminals, whereby the n split inductors and the n DC-to-AC converters establish a polyphase ring connection, the plurality of n split inductors having inductive cross-coupling links;

cross-connecting the n split inductors with inductive cross-coupling links, the inductive cross-coupling links being inductively connected to the inductor half-segments at opposite sides of the polyphase ring connection; and cascading the polyphase stages by feeding the AC outputs of one of the polyphase stages to the inputs of another one of the polyphase stages.

7. The method of providing DC-to-AC voltage conversion of claim 6, wherein the polyphase stages comprise three-phase stages, wherein n=3, whereby the inductor half segments comprise six inductor half-segments.

8. The method of providing DC-to-AC voltage conversion of claim 6, wherein the polyphase stages comprise three-phase stages and provide a delta configuration output at the center tap terminals.

9. The method of providing DC-to-AC voltage conversion of claim 6, wherein the polyphase stages comprise three-phase stages and the inductor half-stages comprise six inductor half-segments and three pairs of mutual inductance inductive links, the method further comprising connecting each pair of the inductor half-segments by one of the pairs of mutual inductance inductive links and electrically separating the mutual inductance inductive links by two of the other inductor half-segments on either side of the mutual inductance inductive links.

10. The method of providing DC-to-AC voltage conversion of claim 6, further comprising the step of providing an AC output at each of the polyphase stages, the plurality of polyphase stages providing a total AC output for all polyphase stages at a preferred AC output voltage at an AC voltage multiple corresponding to the number of cascaded polyphase stages, minus conversion losses.

* * * * *